United States Patent [19]

Weder

[11] Patent Number: 5,156,702
[45] Date of Patent: * Oct. 20, 1992

[54] A PROCESS FOR FORMING A PAPER, BURLAP OR CLOTH FLOWER POT COVER

[76] Inventor: Donald E. Weder, 621 W. Main, Highland, Ill. 62249

[*] Notice: The portion of the term of this patent subsequent to Dec. 31, 2008 has been disclaimed.

[21] Appl. No.: 801,991

[22] Filed: Dec. 3, 1991

Related U.S. Application Data

[63] Continuation of Ser. No. 407,871, Sep. 15, 1989, Pat. No. 5,076,874, which is a continuation-in-part of Ser. No. 357,978, May 26, 1989, abandoned, which is a continuation-in-part of Ser. No. 314,951, Feb. 24, 1989, abandoned.

[51] Int. Cl.⁵ .............................................. B32B 31/00
[52] U.S. Cl. ..................................................... 156/212
[58] Field of Search ................. 156/245, 212, 224; 428/36.1, 34.2, 35.6, 35.7; 47/66, 72; 206/423

[56] References Cited

U.S. PATENT DOCUMENTS

| | | | |
|---|---|---|---|
| 2,355,559 | 8/1944 | Renner | 229/8 |
| 4,773,182 | 9/1988 | Weder et al. | 47/72 |
| 5,076,874 | 12/1991 | Weder | 156/245 X |

*Primary Examiner*—David A. Simmons
*Assistant Examiner*—James J. Engel, Jr.

[57] ABSTRACT

A flower pot cover made by placing a sheet of natural or synthetic burlap or combination thereof, natural or synthetic fiber or combinations thereof, or paper over a material capable of being formed into a predetermined shape by forming a plurality of overlapping folds in said material and then forming at least the two materials simultaneously into the predetermined shape of the flower pot cover.

A flower pot cover comprising a sheet of natural or synthetic burlap or combinations thereof, natural or synthetic fiber or combinations thereof, or paper treated with a shape-sustaining agent to retain the predetermined shape of the flower pot cover.

11 Claims, 2 Drawing Sheets

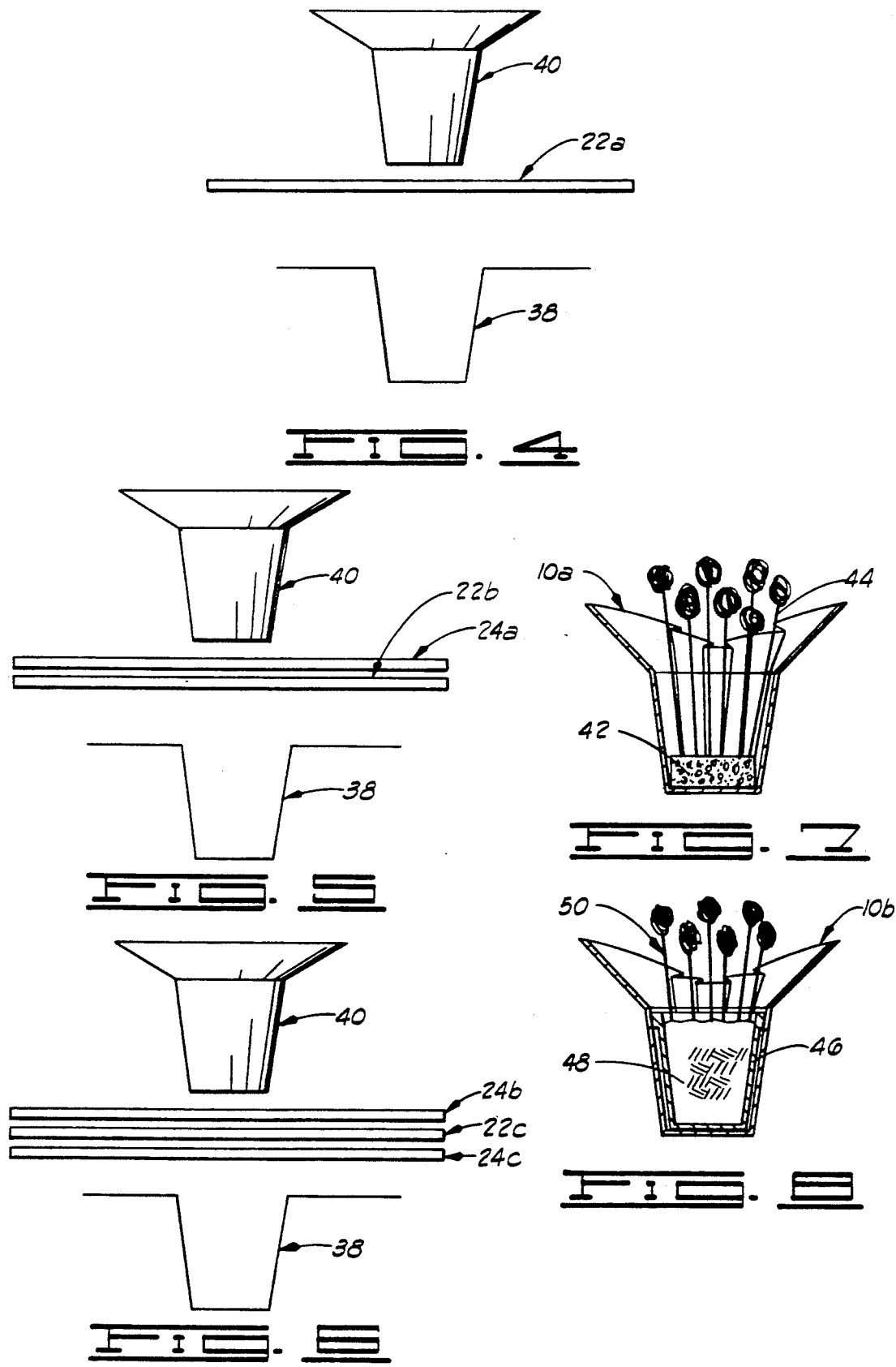

A PROCESS FOR FORMING A PAPER, BURLAP OR CLOTH FLOWER POT COVER

CROSS REFERENCE TO RELATED APPLICATIONS

This application is a continuation of U.S. Ser. No. 407,871, filed Sep. 15, 1989, now U.S. Pat. No. 5,076,874 which is a continuation-in-part of U.S. Ser. No. 357,978 now abandoned entitled A PROCESS FOR FORMING A PAPER, BURLAP OR CLOTH FLOWER POT COVER filed May 26, 1989 which is a continuation-in-part of U.S. Ser. No. 314,951 now abandoned entitled A PROCESS FOR FORMING A BURLAP OR CLOTH FLOWER POT COVER, filed Feb. 24, 1989. These applications are hereby incorporated by reference.

FIELD OF THE INVENTION

The present invention relates to a process for forming a flower pot cover by treating a sheet of natural or synthetic burlap or combinations thereof, a natural or synthetic fiber or combinations thereof, or paper by placing a sheet of this material over a sheet of material capable of being formed into a predetermined shape by forming a plurality of overlapping folds in said material, and then forming the two sheets simultaneously into the predetermined shape of a flower pot cover; or by applying a shape-sustaining agent to at least one sheet of the material.

BRIEF DESCRIPTION OF THE DRAWINGS

FIG. 4 is a sectional view showing one sheet of material treated with a shape-sustaining agent used to form a flower pot cover in the shape shown in FIG. 1.

FIG. 5 is a sectional view showing two sheets of material used to form a flower pot cover disposed generally between a male die and a female die.

FIG. 6 is a sectional view showing three sheets of material used to form a flower pot cover disposed generally between a male die and a female die.

FIG. 7 is a sectional view of a flower pot cover used as a floral container.

FIG. 8 is a sectional view of a flower pot cover used to receive a flower pot.

DESCRIPTION OF THE PREFERRED EMBODIMENTS

Figure 1:
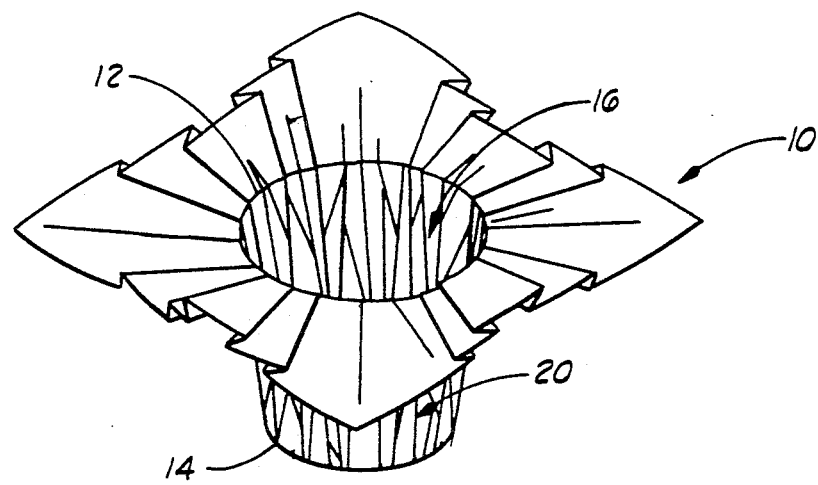
FIG. 1 is a perspective view of a flower pot cover formed by the process of the present invention.

Shown in FIG. 1 and designated therein by the general reference numeral 10 is a flower pot cover constructed in accordance with the present invention. "Flower Pot Cover" means a floral container or a cover which receives a flower pot. "Floral Container" is a container which will be used for floral arrangements such as made from cut flowers, dried materials, silk flowers and other artificial flowers, and other decorations. One such floral container is shown in FIG. 7 where styrofoam 42 or another such substance capable of receiving stems 44, for example, is disposed inside the flower pot cover 10a. FIG. 8 shows the flower pot cover 10b having a flower pot contained therein. The flower pot 46 contains dirt 48 and flowers 50.

The flower pot cover has an upper end 12 and a lower end 14. An object opening 16 is formed through the upper end 12 of the flower pot cover 10 and the object opening 16 extends a distance through the flower pot cover 10. The object opening 16 is sized and shaped to receive a flower pot. A skirt 18 is formed on the upper end 12 of the flower pot cover 10 and the skirt 18 extends a distance outwardly from the upper end 12 of the flower pot cover 10. The flower pot cover 10 is formed in the predetermined shape of the flower pot cover 10 by forming a plurality of overlapping folds, only some of the overlapping folds being shown in FIG. 1 diagrammatically and designated therein by the general reference numeral 20. A flower pot cover constructed by forming overlapping folds in a sheet of material using a male and a female die is described in detail in U.S. Pat. No. 4,773,182, entitled "ARTICLE FORMING SYSTEM", issued Sep. 27, 1988, specifically herein incorporated by reference.

The flower pot cover 10 may be constructed from at least one sheet of material selected from a group of materials comprising a natural or synthetic burlap or combinations thereof, a natural or synthetic fiber or combinations thereof or any form of paper including, but not limited to waxed paper and paper towels. "Fiber" as used herein may be any type of fibrous material such as cloth, e.g., wool, cotton, polyester, rayon and blends thereof including denim.

These particular materials are normally non-shape sustaining in that if these materials were formed in the shape of a flower pot cover, the material would not function to retain that shape. Therefore, these materials are treated in order to retain a shape as described herein and/or combined with at least a second sheet of material capable of retaining a shape as shown in FIG. 1 and described herein.

Figure 2:
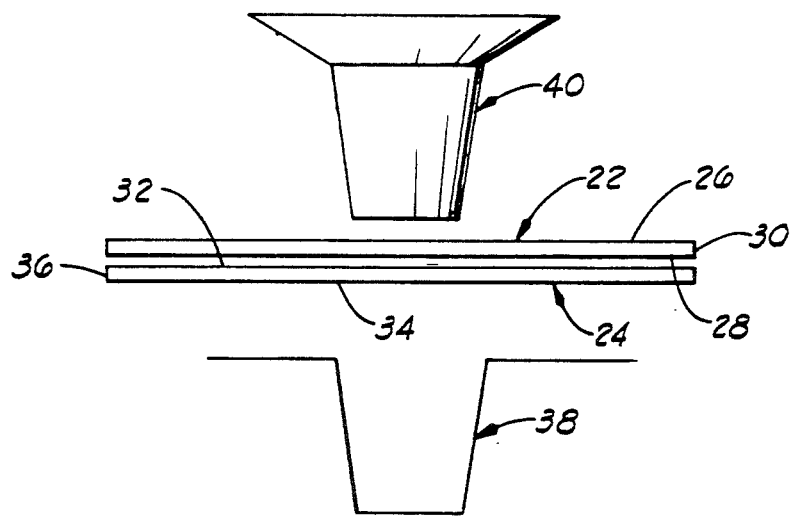
FIG. 2 is a sectional view showing two sheets of material used to form the flower pot cover shown in FIG. 1 disposed generally between a male die and a female die.
Figure 3:
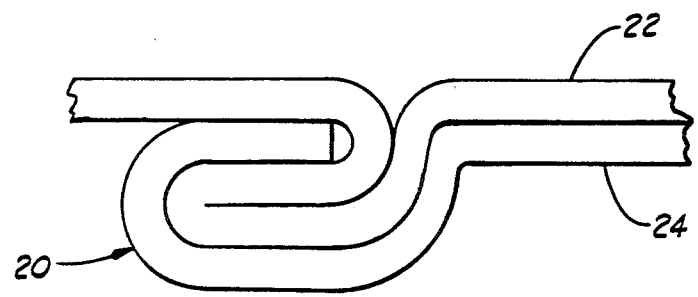
FIG. 3 is a partial sectional view of a portion of the flower pot cover shown in FIG. 1 and illustrating the overlapping folds used to form the flower pot cover shown in FIG. 1.

In one embodiment, the flower pot cover 10 is formed from a first sheet of material 22 and a second sheet of material 24 with the first and the second sheets of material 22 and 24 being shown in FIG. 2. The first sheet of material 22 has an upper surface 26, a lower surface 28 and an outer peripheral surface 30. The second sheet of material 24 has an upper surface 32, a lower surface 34 and an outer peripheral surface 36. The first sheet of material is placed generally over the second sheet of material so that the lower surface 28 of the first sheet of material is disposed generally adjacent the upper surface 32 of the second sheet of material 24. The first and the second sheets of material 22 and 24 then are disposed generally over a female die 38 and a male die 40 then is brought into mating engagement with the female die 38 with the first and the second sheets of material 22 and 24 being disposed generally between the male and the female dies 40 and 38 for forming the first and the second sheets of material 22 and 24 into the predetermined shape of the flower pot cover 10. During the forming process as the male and the female dies 40 and 38 are brought into mating engagement, the overlapping folds 20 are formed in the sheets of material 22 and 24.

In FIG. 2, the flower pot cover formed as previously described has the second sheet 24 of material on the outside of the flower pot cover. In FIG. 5, the flower pot cover formed as previously described has the first sheet 22a of material on the outside of the flower pot cover. In FIG. 6, the flower pot cover formed as previously described has the first sheet 22b of material between two second sheets 24b, 24c of material. In FIG. 4, a flower pot cover 10 comprising a first sheet of material 22 treated with a shape-sustaining agent, as described hereafter, is formed from a female die 38 and a male die 40 in the same manner as previously described.

The first sheet of material 22 is formed from a material selected from a group of materials comprising a natural or synthetic burlap or combinations thereof, a natural or synthetic fiber or combinations thereof, or paper. The second sheet of material 24 is formed of a material which is capable of being formed into a predetermined shape by forming a plurality of overlapping folds in this material wherein the overlapping folds cooperate to provide the structural integrity for cooperating to hold this particular material in the formed, predetermined shape. The second sheet of material 24 is formed of a material preferably selected from a group of materials comprising a man-made processed organic polymer film, a cellophane, paper, foil or combinations thereof.

The term "processed organic polymer film" as used herein means a man-made resin such as polypropylene as opposed to naturally occurring resins such as cellophane. A processed organic polymer film is relatively strong and is not as readily subject to tearing (substantially non-tearable) as paper or foil for example. Such films are synthetic polymers formed or synthesized from monomers. A processed organic polymer film is virtually waterproof which is desirable when forming a flower pot cover and which is not true of an untreated paper, for example, unless the paper is treated with a water resistant coating or impregnated with a water resistant material or laminated with a waterproofing material. It also should be noted that some paper such as long fiber papers are substantially resistant to tearing (substantially non-tearable). The processed organic polymer film also is not subject to deterioration and sunlight as may be a cellophane for example.

In the present application, the second sheet of material 24 preferably is a relatively thin sheet of material having a thickness in a range of from less than about 1.0 mils to about 2.5 mils. The upper limit on the thickness may vary depending on the type of material selected. The upper limit on the thickness is set such that the material retains flexibility and foldability. As a practical matter, the upper limit is about 20 mils.

A decorative pattern such as a solid color and/or an embossed pattern (not shown) and/or other decorative surface ornamentation is applied to the upper or lower surfaces 32 or 34 or both in one preferred embodiment.

The second sheet of material 24 may be thermal setting in the sense that, when the male and the female dies 38 and 40 are brought into mating engagement and heat is applied to either the male or the female 40 or 38 or both, the overlapping folds 20 are substantially permanently formed in the second sheet of material 24. Further, when heat is applied, the overlapping folds formed in the second sheet of material 24 are adhered or connected to adjacent portions of the second sheet of material 24 for cooperating to maintain the structural integrity of the predetermined, formed shape. In these instances, heat is applied to either the male die 40 or the female die 38 or both.

In another embodiment, an adhesive also may be applied to the upper surface 32 or the lower surface 34 or both of the second sheet of material 24 so that adjacent portions of the second sheet of material 24 are adhesively connected when the overlapping folds 20 are formed in the second sheet of material.

The overlapping folds formed in the second sheet of material 24 are interleafed in the overlapping folds formed in the first sheet of material 22 during the forming process. This interleafing of the overlapping folds 20 formed in the first and the second sheets of material 22 and 24 cooperate to connect the second sheet of material 24 to the first sheet of material 22. Further, this interleafing of the overlapping folds 20 and the first and the second sheets of material 22 and 24 cooperate so that the overlapping folds in the second sheet of material 24 cooperate with the overlapping folds with the first sheet of material 22 so that the second sheet of material 24 cooperates to hold the first sheet of material 22 in the predetermined shape of the flower pot cover 10 after the forming process.

In one preferred form, the second sheet of material 24 is adhesively connected or laminated to the first sheet of material 22 prior to placing the sheets of material 22 and 24 between the male and female dies 40 and 38 forming the flower pot cover.

In one preferred form, the burlap first sheet of material is moistened and then placed on the second sheet of material. The first and second sheets of material 22 and 24 then are formed into the pot cover.

In one other form, a second sheet of material may be placed on both sides of the first sheet of material which may enhance the structural integrity in some applications.

In one preferred form, overlapping folds such as the overlapping folds 20 are not formed in the skirt 18.

In one other form, an adhesive is applied to the upper surface 26 or the lower surface 28 or both of the first sheet of material 22. In this form, the first sheet of material 22 without the second sheet of material 24 is placed between the male and the female die 40 and 38 and the predetermined shape of the flower pot cover 10 is formed by bringing the male and the female dies 40 and 38 into mating engagement with the first sheet of material 22 disposed therebetween. The adhesive on the upper or lower surfaces 26 or 28 or both of the first sheet of material 22 cooperates to adhesively connect adjacent portions of the second sheet of material 22 when the overlapping folds 20 are formed in the first sheet of material 22. In this instance, the adhesive adhered overlapping folds 20 in the first sheet of material 22 cooperate to maintain the structural integrity of the predetermined shape of the flower pot cover in the formed first sheet of material 22. In this particular example, the first sheet of material normally is not waterproof and, in some applications, it is desirable to treat the first sheet of material 22 with a waterproofing substance to impart a waterproofing characteristic to the first sheet of material 22. The waterproofing characteristic also can be accomplished by laminating a waterproof paper or film to the first sheet of material 22 prior to forming the first sheet of material 22 in the predetermined shape of the flower pot cover 10.

Adhesive may also be applied to glue down the folds 20 after the flower pot cover 10 has been formed if any folds require further restraint. Usually this will only be needed for larger folds 20 formed in the flower pot cover 10 on the outer surface of the flower pot cover 10.

Since the first sheet of material 22 normally is non-shape sustaining, the first sheet of material 22 also can be formed in the predetermined shape of the flower pot cover 10 by treating the first sheet of material 22 with a shape-sustaining agent capable of imparting a dead fold characteristic to the first sheet of material 22. The term "dead fold" is used herein means that the material when folded will substantially function to retain the folded shape. The shape-sustaining agent for treating the first sheet of material may be a sugar, glue or starch for example. Referring to FIG. 4, the first sheet of material 22 treated with the shape-sustaining agent is placed between a female die 38 and a male die 40 as previously described and formed into a predetermined flower pot cover. The flower pot cover can be formed in the predetermined shape of the flower pot cover 10 by forming the overlapping folds 20 and the imparted dead fold characteristic will cooperate with the first sheet of material 22 so that the first sheet of material 22 retains the predetermined shape of the flower pot cover without having to use the second sheet of material.

The shape-sustaining treatment of the flower pot cover 10 may comprise the addition of any shape-sustaining agent to the sheet of material 22 which provides the necessary dead fold characteristics thereto. Preferably the shape-sustaining agent is selected from the group consisting of sugar, glue or starch. The shape-sustaining agent is in a form which substantially uniformly covers the sheet of material 22 or can be applied to the dies 38 and 40 to adhere to the sheet of material 22, e.g., powder or liquid. The shape-sustaining agent is applied to the sheet of material or the dies 38 and 40 prior to placing the sheet of material between the dies 38 and 40.

Starch as used herein means any stiffening or sizing agent such as a carbohydrate polymer which may impart deadfold characteristics to the material utilized in accordance with the present invention. The starch may be in powdered or liquid form. If in a liquid form, the liquid starch may be sprayed on the material, or the sheet of material dipped in the liquid. If the starch dries on the material and if this is not acceptable to the process, the material may be moistened prior to exposure to the dies.

In a preferred embodiment, a spray starch such as Niagra Spray Starch by Best Foods, CPC International, Inc., Englewood Cliffs, N.J., is sprayed onto a sheet of burlap in a quantity sufficient to impart dead fold characteristics to the burlap. The treated burlap is placed between the male and female dies 40 and 38 as previously described and a flower pot cover 10 is formed as described herein.

In another embodiment, sucrose (one type of sugar) and a diluent such as water is mixed until the sugar dissolves. A sufficient amount of sugar is added to the diluent which will impart a dead fold characteristic to the material utilized in accordance with the present invention. This will, in part, depend upon the type of material utilized and the thickness of the material. The sugar mixture is then applied to the upper surface and/or the lower surface of a paper towel such as Premiere towels made by Scott Paper Co., Philadelphia, Pa. The sugar mixture may be sprayed on the sheet of material or the sheet of material dipped in the sugar mixture before the flower pot 10 is formed. If the sugar mixture dries on the material and if this is unacceptable to the process, the material may be moistened before exposure to the dies.

Changes may be made in the construction and the operation of the various components and assemblies described herein and changes may be made in the step or the sequence of steps of the methods described herein without departing from the spirit and scope of the invention as defined in the following claims.

What is claimed is:

1. A method for making a flower pot cover having an outer peripheral surface comprising:

placing a first sheet of material comprising a non-shape sustaining material selected from a group consisting of a natural or synthetic burlap or combinations thereof, a natural or synthetic fiber or combinations thereof, or paper over a second sheet of material selected from a group of materials consisting of a man-made processed organic polymer film or cellophane or combinations thereof;

forming the first and the second sheets of material simultaneously into a predetermined shape of the flower pot cover with the second sheet of material forming the outer peripheral surface of the flower pot cover by forming overlapping folds in the first and the second sheets of material, the overlapping folds in the second sheet of material being interleaved with the overlapping folds in the first sheet of material for cooperating to connect the second sheet of material to the first sheet of material and the overlapping folds in the second sheet of material cooperating to maintain the first and the second sheets of material in the predetermined shape of the flower pot cover; and applying means, either before, during or after the forming of the first and the second sheets of material, to at least one of the first and second sheets of material whereby portions of the overlapping folds of the second sheet of material which contact other portions of the second sheet of material are substantially connected.

2. The method of claim 1 wherein the second sheet of material is further defined to comprise a material which substantially seals to itself when heat is applied thereto, and wherein the step of applying means to the second sheet further comprises:

applying a sufficient amount of heat to the second sheet of material while forming the first and the second sheets of material into the predetermined flower pot cover whereby the portions of the overlapping folds of the second sheet of material which contact other portions of the second sheet of material are substantially sealingly connected.

3. The method of claim 1 further comprising:

connecting the first sheet of material to the second sheet of material prior to forming the first and the second sheets of material into the predetermined shape of the flower pot cover.

4. The method of claim 1 wherein the second sheet of material is defined further as being substantially waterproof.

5. The method of claim 4 wherein the first sheet of material is defined further as being substantially non-waterproof.

6. The method of claim 1 wherein the second sheet of material is defined further as being substantially non-shape sustaining.

7. The method of claim 6 wherein the first sheet of material is defined further as being substantially non-shape sustaining.

8. A method for making a flower pot cover comprising: applying an adhesive to at least one of an upper surface or a lower surface of a sheet of material wherein the sheet of material is selected from a group of materials comprising a non-shape sustaining natural or synthetic burlap or combinations thereof, a natural or synthetic fiber or combinations thereof or paper; and forming the sheet of material into a predetermined shape of the flower pot cover by forming overlapping folds in the sheet of material, the adhesive on the sheet of material cooperating to connect portions of the overlapping folds of the overlapping folds cooperate to maintain the sheet of material in the formed predetermined shape of the flower pot cover.

9. The method of claim 1 wherein a substantial portion of the overlapping folds in the second sheet are connected.

10. The method of claim 1 in which the first sheet of material and the second sheet of material are not secured together prior to the forming step.

11. The method of claim 3 in which the first sheet of material and the second sheet of material are not secured together prior to the forming step.

* * * * *

UNITED STATES PATENT AND TRADEMARK OFFICE
CERTIFICATE OF CORRECTION

PATENT NO. : 5,156,702
DATED : October 20, 1992
INVENTOR(S) : Donald E. Weder

It is certified that error appears in the above-identified patent and that said Letters Patent is hereby corrected as shown below:

Column 2, line 35, the word "material" should be --materials--.

Column 4, line 50, the word "adhesive" should be --adhesively--."

Column 6, line 7, after the word, and --the-- should be inserted.

Column 8, line 1, after the word, folds, insert --,--.

Column 8, lines 1 and 2, delete the phrase "of the overlapping folds".

Signed and Sealed this

Nineteenth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,156,702

DATED : October 20, 1992

INVENTOR(S) : Donald E. Weder

It is certified that error appears in the above-identified patent and that said Letters Patent is hereby corrected as shown below:

Cover Sheet, after '[76] Inventor: Donald E. Weder, 621 W. Main, Highland, Ill. 62249', please insert a new section --[73] Assignee: Highland Supply Corporation, Highland, Ill. 62249--.

Signed and Sealed this

Fourth Day of April, 1995

Attest:

Attesting Officer

BRUCE LEHMAN

*Commissioner of Patents and Trademarks*